Aug. 10, 1926.
G. W. MERIDITH
ATTACHMENT FOR TRACTORS
Filed March 12, 1923  2 Sheets-Sheet 1
1,595,560
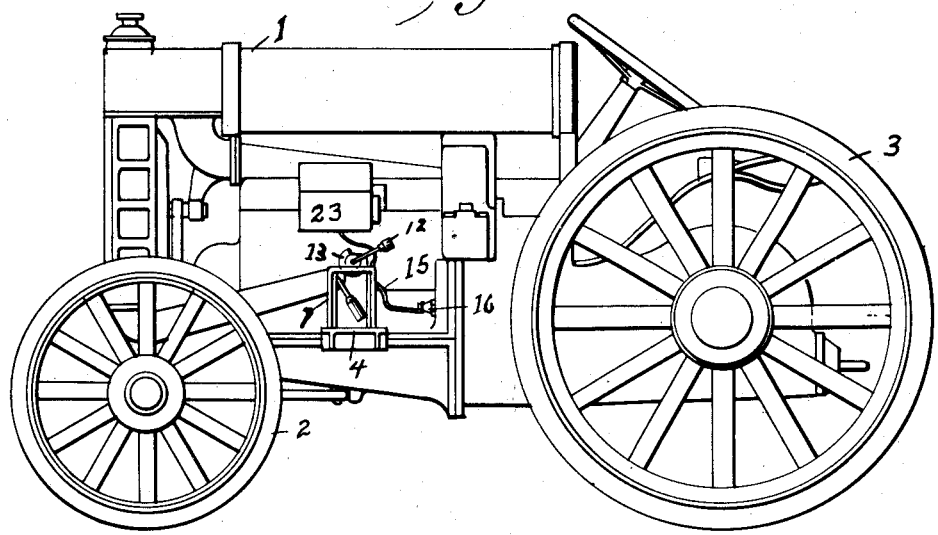
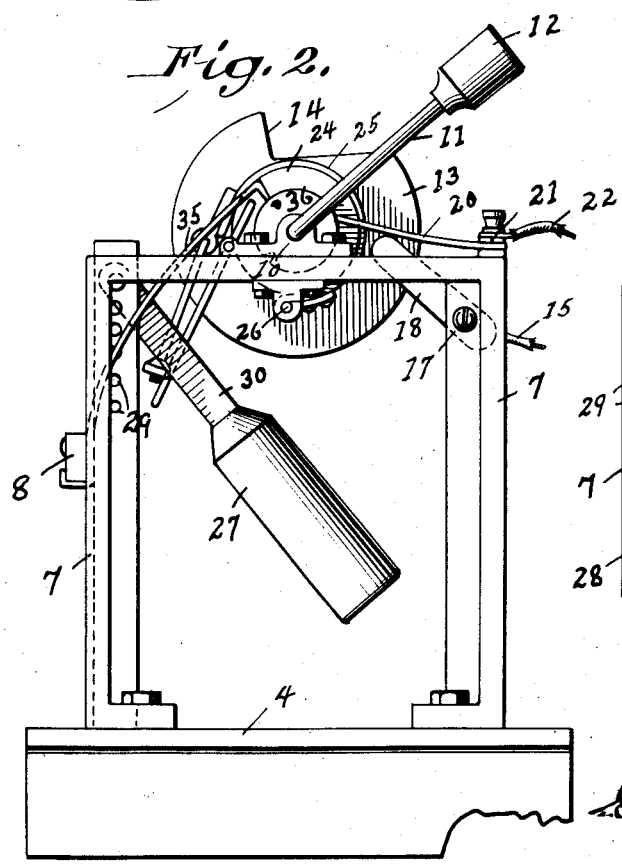
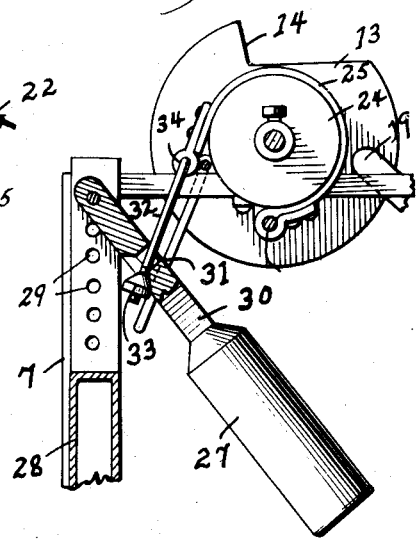
Inventor
George W Meridith Aug. 10, 1926.

G. W. MERIDITH

ATTACHMENT FOR TRACTORS

Filed March 12, 1923

Inventor

George W. Meridith

Patented Aug. 10, 1926.

1,595,560

UNITED STATES PATENT OFFICE.

GEORGE W. MERIDITH, OF CENTRAL CITY, KENTUCKY.

ATTACHMENT FOR TRACTORS.

Application filed March 12, 1923. Serial No. 624,662.

This invention relates to an attachment for tractors, especially the well-known Fordson tractor, and has for its prime object to provide means for the safety of the driver operating the tractor.

A further object of my invention is to provide an attachment for tractors that will prevent the tractor from rearing over backwards and seriously injuring the driver of same.

A still further object of my invention is to provide an attachment for tractors that will automatically break the ignition circuit when the front of the tractor raises to a certain height.

And a still further object of the invention is to provide a device of the above indicated character, which will hold the ignition circuit open until the tractor has righted itself and the automatic self-operating circuit breaker has been reset.

An additional object of the invention is to provide a safety attachment of the above indicated character for tractors, which is simple in construction, durable, efficient for the purpose intended, and one that can be manufactured and installed on tractors at a relatively low cost.

These and like objects of the invention will be better understood as the description follows and as is specifically pointed out in the appended claims.

Referring to the accompanying drawings which form a part of this specification:—

Figure 1 is a side elevation of a Fordson tractor equipped with a safety attachment constructed in accordance with my invention.

Figure 2 is an end elevation of my improved safety attachment.

Figure 5 is a vertical section taken on line 5—5 of Figure 3, looking in the direction of the arrows.

Referring to the accompanying drawings in detail, like numerals will be used to designate like parts in the different views.

Figure 3:
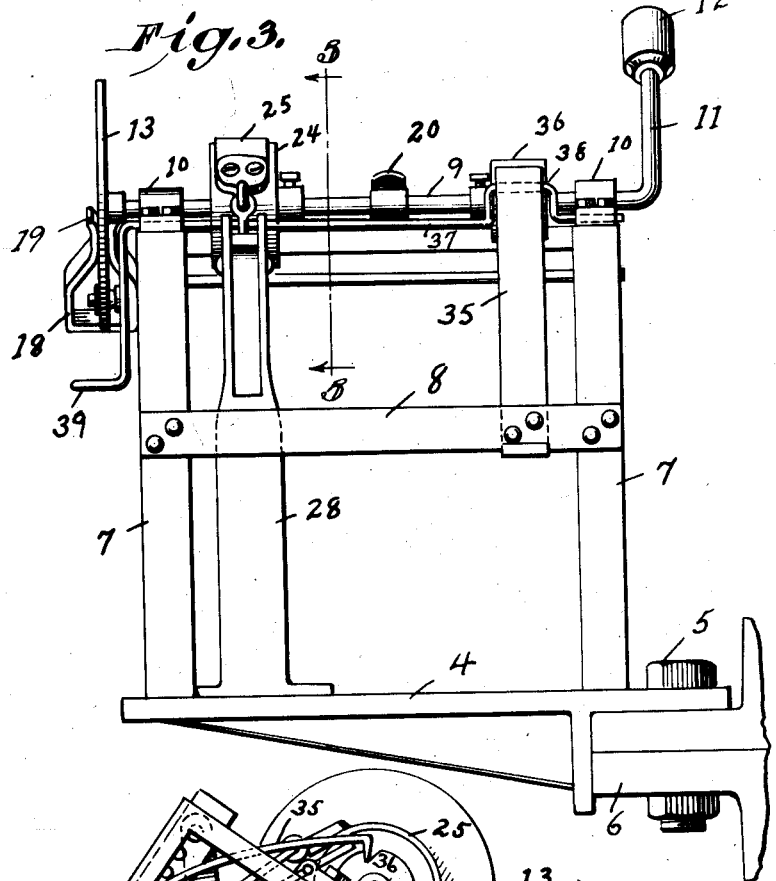
Figure 3 is a side elevation of my safety atachment, showing same in a set position.

In the drawings, the numeral 1 indicates a Fordson tractor of the usual construction, which is provided with front and rear wheels 2 and 3 respectively.

In the operation of the Fordson tractor, it has been found from experience that when the tractor is at a certain angle on the ground or in case the load being hauled is too great for the tractor, that the front of the tractor will rise upwardly, often turning completely over and killing or seriously injuring the driver of same. With the use of my safety attachment, this trouble is prevented.

My safety attachment comprises a base plate 4, which is securely mounted by means of bolts 5 on flanges 6 of the crank case of the tractor, as is clearly indicated in Figures 1 and 3. Mounted on the base 4 at opposite ends are a pair of U-shaped supporting members 7, which are connected together by means of a cross brace 8.

A shaft 9 is mounted in bearings 10, which are supported on the U-shaped members 7. The shaft 9 extends beyond the edges of the supports 7 and one end of the shaft is bent at right angles as at 11 and is provided with a weight 12 on the end of same, the purpose of which will be better understood as the description follows. A disk 13 is keyed or secured in any suitable manner on one end of the shaft 9 and is provided with a cutaway portion as at 14.

A wire 15 is connected at one end to a magneto plug 16, while the opposite end has a terminal as at 17 secured to one of the U-shaped members 7. Attached to the terminal 17 of the wire 15 is a U-shaped clamp 18, which engages the disk 13. It is to be understood that the clamp 18 which is constructed of spring steel and provided with spring fingers 19 firmly engages the disk for carrying electric current from the magneto, through the disk, through the shaft 9, to a spring contact arm 20, which is mounted on one of the cross braces 8. The current then passes through the spring arm 20 to a terminal 21 which is connected by means of a wire 22 with the coil box 23 of the tractor, thus completing the ignition system, allowing the operation of the tractor in the usual manner.

A brake 24 is fastened to the shaft 9, and a brake band 25 which has one end secured to a bracket 26 encircles the brake for the greater part of its periphery. A weight 27, which is greater than the first mentioned weight 12 is pivotally supported in a bracket 28, the upper end of which is bifurcated and provided with openings 29, so that the weighted member 27 can be adjusted by changing the point of pivot thereon. The reduced end 30 of the weighted member 27 is provided with a slotted recess 31 extending therethrough, through which passes a bolt 32 having an enlarged head 33 secured thereon. The opposite end of the bolt 32 is secured to the free end of the brake band 25, as at 34.

When my safety device is in the position indicated in Figures 1, 2, and 3, which would be the position when the tractor was operating in the usual manner, the weight of the member 27 would cause a binding action between the brake 24 and brake band 25, which would hold the weighted member 12 in a raised position, thus permitting no interruption in the ignition circuit.

When the front of the tractor starts to rise upwardly due to reasons as explained above, the weighted member 27 would swing on its pivot, thus reducing the pressure of the brake band 25 on the brake 24, which would allow the weight 12 on the bent end 11 of the shaft 9 to drop downwardly, thus bringing the cutaway portion 14 of the disk 13 into engagement with the spring U-shaped member 18, thus interrupting the ignition circuit and automatically stopping the tractor, which would allow same to return to its normal position.

Figure 4:
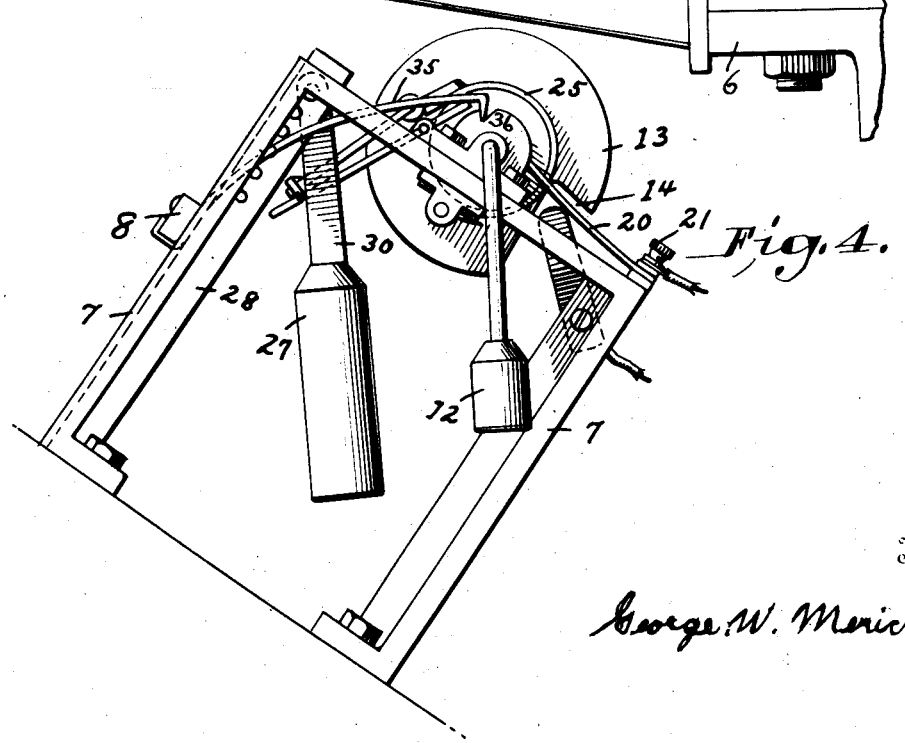
Figure 4 is an end elevation of my improved safety attachment, showing the ignition circuit broken as will be the case when the front of the tractor raises to a certain height.

When the weight 12 drops downwardly, a spring ratchet arm 35 engages a ratchet wheel 36 and holds the safety device in the position indicated in Figures 4 and 5.

After the tractor has righted itself and it is desired to reset the safety device, the spring ratchet arm 35 is disengaged from the ratchet 36 by means of a release rod 37, which is provided with a bell crank 38 for engagement with the spring ratchet arm 35 and operated by means of a handle 39.

In view of the foregoing description of my invention taken in connection with the accompanying drawings, it is thought that any further explanation as to the construction, operation, and objects of this invention is unnecessary.

While I have shown and described the preferred form of my safety attachment, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:—

1. A device of the character described comprising a supporting frame, a shaft journaled on said supporting frame, means mounted on said supporting frame and shaft for opening and closing an electric circuit according to the rotary position of said shaft, a weight operated member adapted to hold said shaft against turning movement when said supporting frame is in a vertical position, and means for turning said shaft when said weight operated member is released by the positioning of said frame at an angle so as to break said circuit.

2. A device of the character described, comprising a supporting frame, a shaft journaled on said supporting frame, means mounted on said supporting frame and shaft for opening and closing an electric circuit according to the rotary position of said shaft, a weight operated member adapted to hold said shaft against turning movement when said supporting frame is in a vertical position, means for turning said shaft when said weight operated member is released by the positioning of said frame at an angle so as to break said circuit, and means carried by said shaft and frame for holding said shaft against further turning movement when said circuit is broken.

3. In a device of the character described comprising a supporting base, a supporting frame mounted on said base, a shaft journaled on said supporting frame having a brake wheel positioned thereon intermediate its ends, a disk having a cutout portion keyed to one end of the shaft, an electric terminal mounted on the supporting frame and normally engaging the disk, a second terminal having a spring arm extending therefrom and engaging the shaft for forming an electric circuit, a brake band engaging the periphery of the brake wheel and having a weighted member at its free end for holding the brake band in engagement with the brake drum, and a weight mounted on the shaft for moving the disk from engagement with the said terminal upon the brake band becoming loose upon the brake wheel.

In testimony whereof, I have affixed my signature.

GEORGE W. MERIDITH.